United States Patent
Merlin et al.

(10) Patent No.: US 9,351,314 B2
(45) Date of Patent: May 24, 2016

(54) PACKET DISSEMINATION IN A WIRELESS NETWORK PERFORMING DISTRIBUTED BEAMFORMING

(71) Applicant: Raytheon BBN Technologies Corp., Cambridge, MA (US)

(72) Inventors: Christophe Jean-Claude Merlin, Malden, MA (US); Joud Khoury, Boston, MA (US); Dan Alan Coffin, Sudbury, MA (US); Jerry Dwight Doty, II, Dracut, MA (US); Michael Brandon Kremer, Cambridge, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 28 days.

(21) Appl. No.: 14/208,032

(22) Filed: Mar. 13, 2014

(65) Prior Publication Data

US 2015/0264705 A1   Sep. 17, 2015

(51) Int. Cl.
*H04J 1/16* (2006.01)
*H04W 72/12* (2009.01)
*H04W 16/28* (2009.01)

(52) U.S. Cl.
CPC .......... *H04W 72/1263* (2013.01); *H04W 72/12* (2013.01); *H04W 16/28* (2013.01)

(58) Field of Classification Search
CPC ... H04W 72/082; H04W 16/28; H04W 40/06; H04W 72/1263; H04W 72/12; H04J 1/16
USPC ......................................................... 370/235
See application file for complete search history.

(56) References Cited

U.S. PATENT DOCUMENTS

| 2008/0075033 | A1 | 3/2008 | Shattil | |
|---|---|---|---|---|
| 2013/0095770 | A1 | 4/2013 | Moshfeghi | |
| 2015/0085680 | A1* | 3/2015 | Vrzic | H04L 5/0055 370/252 |
| 2015/0245402 | A1* | 8/2015 | Mochizuki | H04W 76/025 370/331 |

FOREIGN PATENT DOCUMENTS

| WO | WO-2007059508 A1 | 5/2007 |
|---|---|---|
| WO | WO-2012151316 A1 | 11/2012 |

OTHER PUBLICATIONS

Adjih, C., et al., "Computing connected dominated sets with multipoint relays", *Technical Report 4597, INRIA—Rapport de recherche*, (Oct. 2002), 20 pgs.

Feng, J., et al., "Analysis of Energy Consumption on Data Sharing in Beamforming for Wireless Sensor Networks", *2010 Proceedings of 19th International Conference on Computer communications and Networks (ICCCN)*, (2010), 1-6.

(Continued)

*Primary Examiner* — Sai-Ming Chan
(74) *Attorney, Agent, or Firm* — Schwegman Lundberg & Woessner, P.A.

(57) ABSTRACT

Embodiments for providing for dissemination of packets in a network performing distributed beamforming are generally described herein. In some embodiments, distributing packets from nodes in a squad local area network using a first waveform to beamforming nodes, providing scheduling to a long link interface for delivering a stream of packets free of scheduling conflict and distributing a copy of the packets from a long link interface based on the provided scheduling and using a second waveform, the first waveform being different from the second waveform.

16 Claims, 4 Drawing Sheets

(56) References Cited

OTHER PUBLICATIONS

Siam, M. Z., et al., "Energy-Efficient Clustering/Routing for Cooperative MIMO Operation in Sensor Networks", *IEEE INFOCOM 2009*, (2009), 621-629.

Wu, J., "An Enhanced Approach to Determine a Small Forward Node Set Based on Multipoint Relays", *IEEE 58th Vehicular Technology Conterence*, vol. 4, (Oct. 2003), 2774-2777.

"European Application Serial No. 15158847.2, Extended European Search Report mailed Jul. 13, 2015", 8 pgs.

\* cited by examiner

PACKET DISSEMINATION IN A WIRELESS NETWORK PERFORMING DISTRIBUTED BEAMFORMING

GOVERNMENT RIGHTS

This invention was made with Government support under Contract Number W911QX-12-C-0039. The Government has certain rights in this invention. Contract #.

BACKGROUND

Transmit beamforming relies on coherent transmission by spatially separated antennas forming constructive interference at the intended receiver. These spatially diverse antennas may be part of an array, multiple-input and multiple-output (MIMO) system or, separate wireless nodes. In the latter case, nodes during beamformed transmissions obtain the packet and a referenced time, common to all, to begin sending.

It is often assumed that nodes are within one-hop, or that a time division multiple access (TDMA)-based MAC schedules the beamformed transmission immediately after dissemination. Reliance on TDMA MAC with scheduling of long link transmission in same round as packet dissemination means scheduling is not used for State-of-the-art data dissemination and scheduling on the beamformed link relies on TDMA-based solutions in which a common schedule is established to deliver copies of the original single-sourced packet to beamforming nodes. Packets are sent on the beamformed link immediately after in-network dissemination, thus obviating the need for scheduling. Perfect communications and one-hop networks are generally assumed. Works that have considered multiple-hop networks use a clustering solution to reduce the problem to that of one-hop networks.

However, if more than one hop is involved, dissemination means nodes receive a copy of a packet at different times. The network cannot wait for nodes to receive one packet and then transmit on the uplink within the same round. Further, the uplink pipe is to be kept full. Packets are to be sent out on uplink at same time by nodes participating in distributed beamforming and dissemination failure is not a cause of conflict/interference.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass available equivalents of those claims.

A beamforming interface is referred to as the "Long Link" because it may have a long range. Embodiments described herein include two packet dissemination processes and a packet scheduling technique intended to maximize the beamformed Long Link capacity for a Squad Local Area Network (SLAN) or the Squad network. The nodes disseminate copies of the original packet via Squad local area network (LAN).

The first dissemination process distributes copies of the same packet to beamforming nodes and the second dissemination process ensures nodes receive packets from the Long Link. The scheduling according to an embodiment delivers a stream of ordered and time synchronized packets to the Long Link module. The SLAN dissemination processes converge in less than 2 seconds and reach non-partitioned nodes.

Figure 1:
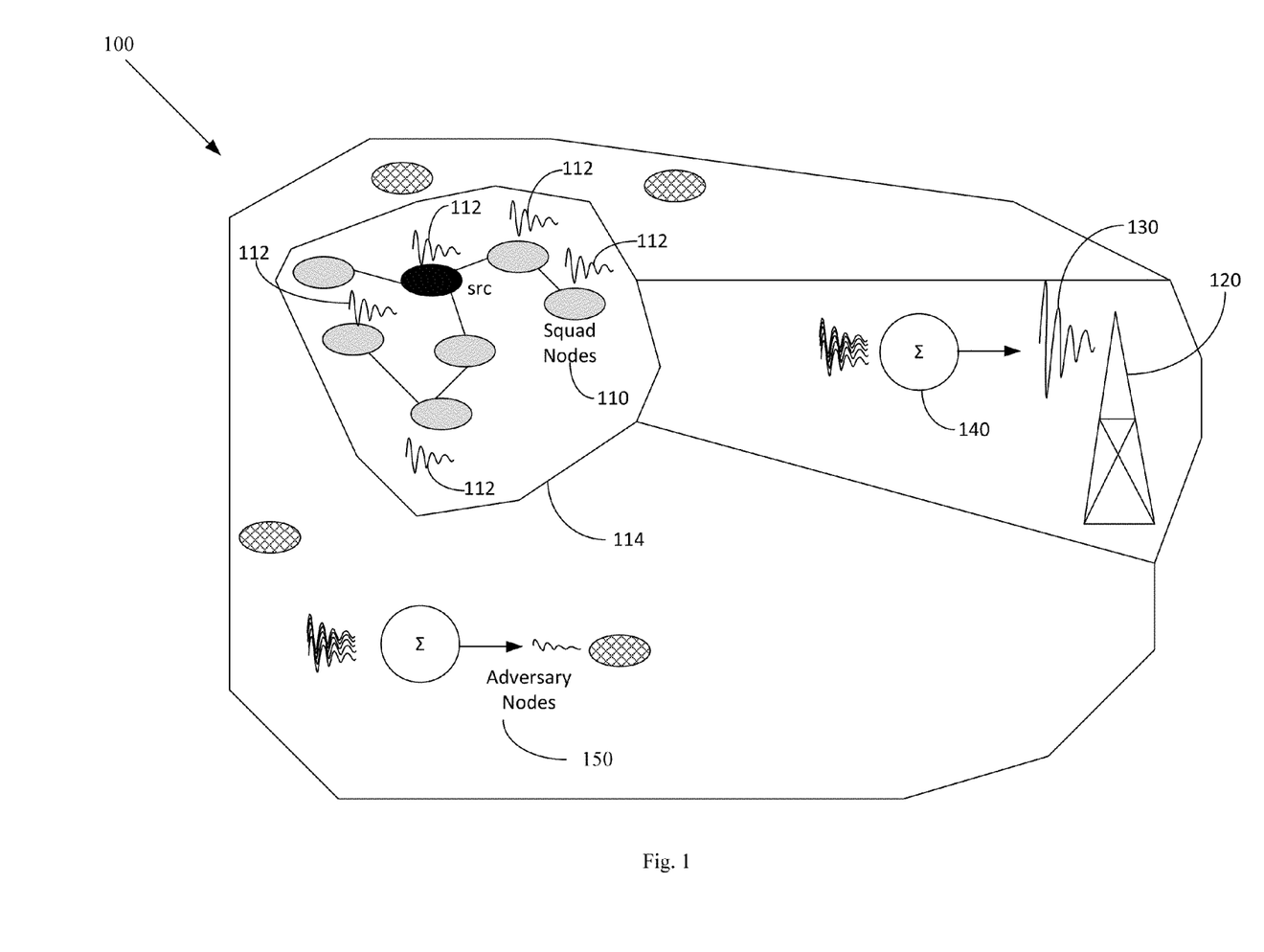
FIG. 1 illustrates distributed beamforming according to an embodiment.

FIG. 1 illustrates distributed beamforming 100 according to an embodiment. In FIG. 1, squad nodes 110 send the same signal/packet 112 from one source. At the intended destination 120, constructive interference occurs resulting in mutual reinforcement to produce a wave 130 with an additive amplitude based on the amplitudes of the individual waves 112. Everywhere else, destructive interference occurs resulting in cancellation of each of the individual waves thereby evading detection and interception.

Thus, FIG. 1 shows that squad nodes 110 coherently send (beamform) the same packet to a faraway destination 120. The beamforming interface is referred to as the Long Link interface 140 because it has a long range. In order to successfully beamform, the squad nodes 110 obtain the same copy of the packet before the squad nodes 110 attempt to transmit coherently. The squad nodes 110 disseminate copies of the original packet via Squad Local Area Network (SLAN) or the Squad network 114. The Squad network interface and the Long Link interface are on different waveforms, i.e., different frequencies, different modulation schemes, etc. In effect, this means the SLAN and Long Link may be used at the same time because they will not interfere. Deconstructive interference is present at the adversary nodes 150.

Figure 2:
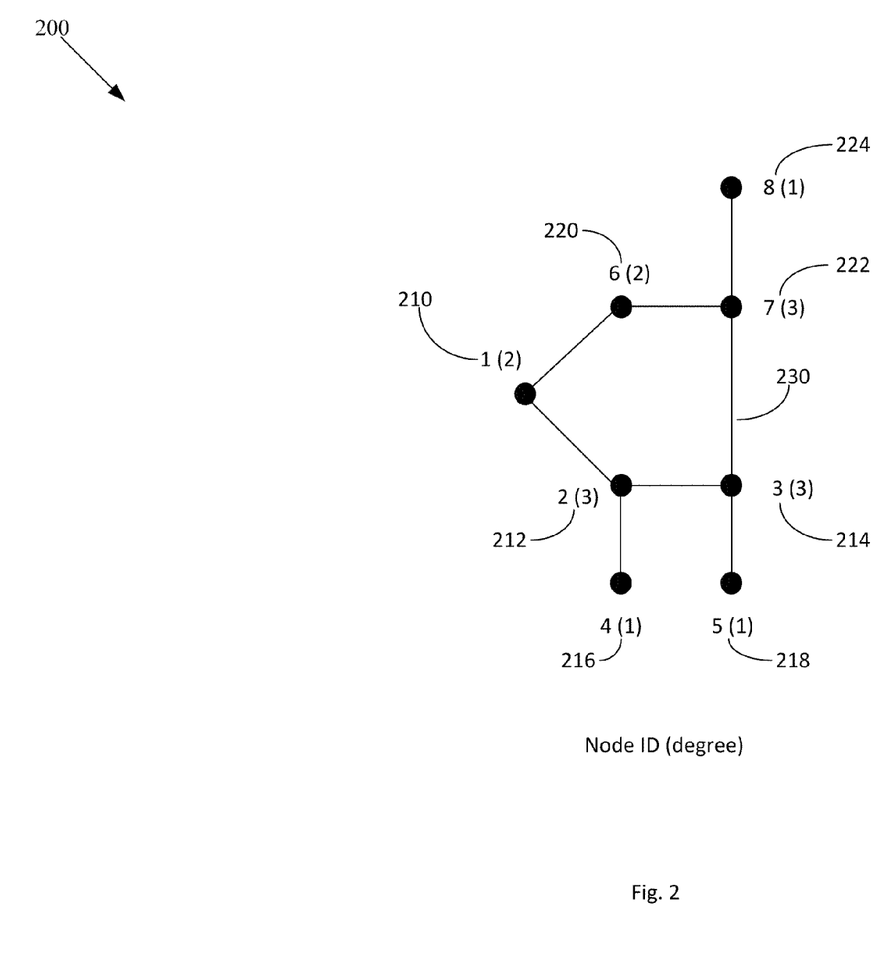
FIG. 2 illustrates a graph of a network of nodes wherein an uplink dissemination process is used according to an embodiment.

FIG. 2 illustrates a graph 200 of a network of nodes wherein an uplink dissemination process is used according to an embodiment. In FIG. 2, 8 nodes 210-24 are shown in the SLAN network 230. According to an embodiment, a dissemination process is iterative by nature. As one node, e.g., node 6 220, completes the process and decides to become a forwarder or not, its neighbors, e.g., node 7 222 and node 8 224, may run the process again to take those changes into account. This may change output of the process, which may modify the process output of a neighbor, and which may propagate changes to the output of other nodes. The process is considered to have converged when the output of the process remains the same for each iteration for the nodes. The time to convergence is the time between when the nodes start up and when the nodes reach their final output.

A source-independent MultiPoint Relay (MPR) process computes a Connected Dominated Set (CDS). The process starts with graph G 200. A working graph, G' is initiated where G'=G. The priority for nodes 210-224 is designated according to (degree, ID), wherein nodes with a higher degree have a higher priority so that ties are broken by ID. Nodes 210-224 start out by being relays to ensure full coverage at start-up. Each of the nodes 210-224 shares its 1-hop neighbor information with its neighbors. The process then prunes down nodes from G'. If a node's neighbors are neighbors, the node leaves the working graph G'. Nodes compute 2-hop cover set, wherein a node leaves the working graph G' when neighbor is not used to cover 2-hop neighbors. Each node receives its neighbors' algorithm output indicating whether it should be part of the CDS and accepts only the output of the highest-priority neighbor, that is, the highest priority nodes have the last word over their lower priority neighbors. Nodes 210-224 reach their eventual output within at most two seconds in some embodiments in which convergence time is a function of how often nodes exchange information. Thus, the SLAN network achieves high capacity and fair access on the Long Link. Referring to FIG. 2, priority is determined according to (degree, node ID), wherein (2, .)>(1, .) and (2,3)>(2,1).

In FIG. 2, Node 1 210 has a degree of 2, Node 2 212 has a degree of 3, Node 3 214 has a degree of 3, Node 4 216 has a degree of 1, Node 5 218 has a degree of 1, Node 6 220 has a degree of 2, Node 7 222 has a degree of 3 and Node 8 224 has a degree of 1. Node 6(2) 220 computes its 2-hop cover set and finds node 7(3) 222 is used to cover 3(3) 214 and 8(1) 224. Only 2-hop information is available. Node 3(3) 214 determines instead that node 7(3) 222 is to cover 6(2) 220 and 8(1) 224. Node 7(3) 222 listens to Node 3(3) 214 because it has a higher degree than Node 6(2) 220. Thus, the Nodes in the computed CDS are 1(2)-2(3)-3(3)-7(3).

FIGS. 3a-f illustrates a downlink dissemination process 300 according to an embodiment. In FIG. 3a-f, Nodes 0-6 310-322 are shown. Nodes know they are either download (DL)-connected (●) or DL-disconnected (x). The connected nodes closest to disconnected neighbors are favored for robustness. Nodes are selected with the smallest number of hops to a DL-connected node. Ties are broken with connectivity information (number of neighbors). Ties are further broken with active forwarding information. Ties are further broken by selecting node with lowest ID. Iteration is periodically performed to reach disconnected nodes more than 1 hop away and to handle mobility.

Figure 3A:
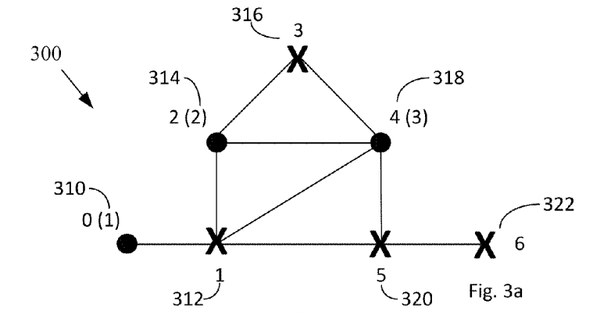
FIGS. 3a-f illustrates a downlink dissemination process according to an embodiment.
Figure 3B:
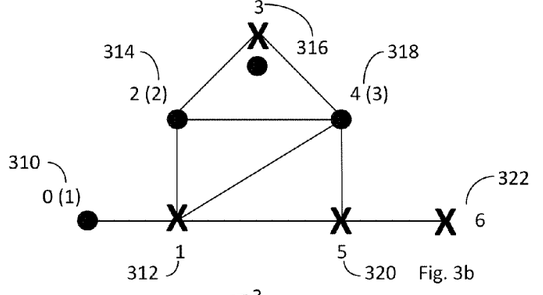
Figure 3C:
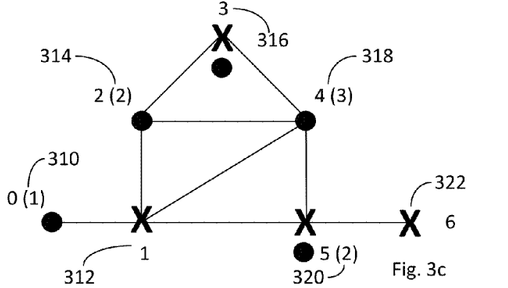

In FIG. 3a, Node 1, Node 3, Node 5 and Node 6 are DL-disconnected. Node 0, Node 2 and Node 4 are DL-connected. In FIG. 3b, Node 6 322 only has disconnected neighbors. Thus, Node 6 322 is not selected. Node 3 316 has Node 4 318, i.e., 4(3), and Node 2 314, i.e., 2(2) as connected neighbors. Node 4 318, 4(3), has a higher priority, i.e., 3>2, and is thus selected as a forwarder. Node 3 316 becomes 1-hop connected. In FIG. 3c, Node 5 has Node 4 318, i.e., 4(3), as a connected neighbor. Thus, Node 4 318 is identified as a forwarder. Node 5 320 becomes 1-hop connected.

Figure 3D:
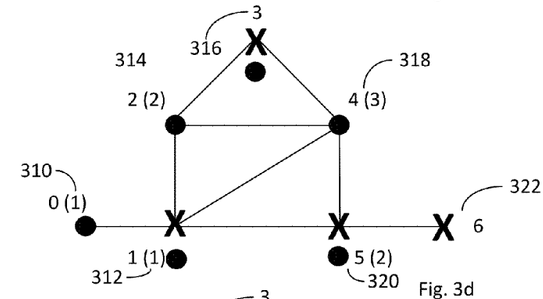
Figure 3E:
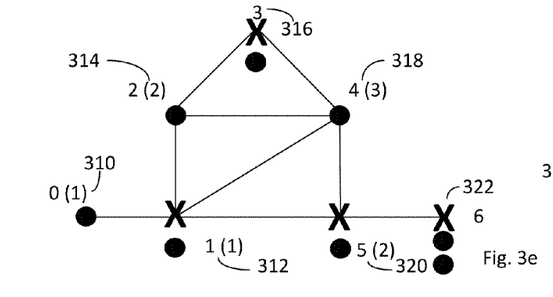
Figure 3F:
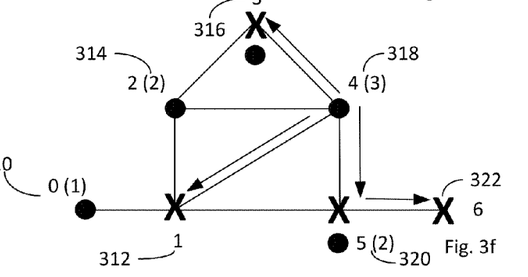

In FIG. 3d, for Node 1 310, the connected neighbors is made up of Node 4 318, Node 2 314 and Node 0 310, i.e., [●4(3), ●2(2), ●0(1)]. Since Node 4 318 has a higher priority, 3>2>1, Node 4 318 is selected as a forwarder. Node 1 becomes 1-hop connected. In FIG. 3e, Node 6 322 has no DL-connected neighbors. Node 5, 320 is a 1-hop connected neighbor and is selected as a forwarder. Node 6 322 becomes a 2-hop connected node. Node 4 318 and Node 5 320 are traffic forwarders. FIG. 3f illustrates the final results, wherein Node 4 318 and Node 5 320 are traffic forwarders.

Figure 4:
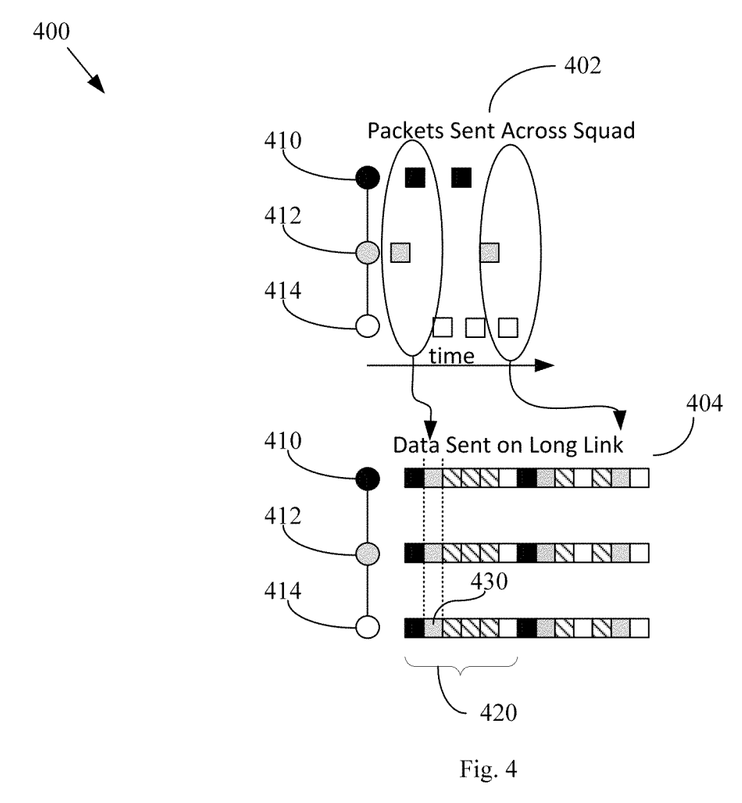
FIG. 4 illustrates packet scheduling in a wireless network performing distributed beamforming according to an embodiment.

FIG. 4 illustrates packet scheduling 400 in a wireless network performing distributed beamforming according to an embodiment. In FIG. 4, three nodes, N1 410, N1 412, N1 414, in a SLAN 402 are shown sending packets. The three nodes, N1 410, N1 412, N1 414, are also shown sending data on the Long Link 404. The Long Link 404 is divided in epochs 420 and slots 430. However, the epochs 420 and slots 430 do not necessarily reflect the actual time-division of the Long Link module. A packet is allocated to future epoch 420 to allow time for dissemination. A consistent time reference is used across beamforming nodes. The number of slots 430 is allocated proportional to nodes' load. Mapping is devised using the source node ID and the packet ID, e.g., {Src Node Id; Pkt Id} to specific future epoch/slot.

Equation 1 illustrates a formula for performing the mapping:

$$ts_i = \left(\left\lceil \frac{t_{now} + hD}{\Delta N} \right\rceil + 1\right) \times \Delta N + n_i\Delta, \quad (1)$$

where $$\left(\left\lceil \frac{t_{now} + hD}{\Delta N} \right\rceil + 1\right) \times \Delta N$$

finds the epoch in the future (hD from now, where hD is the maximum dissemination delay), and $n_i\Delta$ is the slot in that epoch with $\Delta$ being the slot time and N is the maximum nodes. Dynamic slot allocation and conflict resolution may also be implemented.

The uplink interface provides uplink hand-off by de-queuing one epoch at a time and reordering packets for that epoch to account for dissemination vagaries and transfers to the Long Link module. The receive time reference periodically stores $t_{now}$ as offset to a monotonically increasing counter and adjusts the time offset.

To illustrate scheduling, slot assignments [1, 2, 3, 4, 5, 6, 7] are considered. For the illustration, the slot time, A, is equal to 50, the maximum dissemination delay is 1000 and the maximum nodes is 7. Two nodes with ID 2 and 6 schedule a packet at time $t_{now}=5$ according to equations 2 and 3:

$$N_2 : ts_2 = \left(\left\lceil \frac{5 + 1000}{50 \times 7} \right\rceil + 1\right) \times 50 \times 7 + 2 \times 50 = 1050 + 2 \times 50 = 1150; \quad (2)$$

and $$N_6 : ts_6 = \left(\left\lceil \frac{5 + 1000}{50 \times 7} \right\rceil + 1\right) 50 \times 7 + 2 \times 50 = 1050 + 6 \times 50 = 1350. \quad (3)$$

Accordingly, uplink dissemination according to an embodiment provides efficient multi-hop dissemination of single-sourced packets throughout the squad. Downlink dissemination according to an embodiment provides robust dissemination of multiple-sourced packets in the squad network. Uplink scheduling according to an embodiment provides a slotted schedule for packet transmissions on long link in the future, sender reservation. A priority rule uses node degrees to break ties using node ID for more efficiency. A pruning process is used to better deal with initializing and partitioning.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method for disseminating packets in a network performing distributed beamforming, comprising:
   distributing packets from nodes in a local area network using a first interface and a first waveform to beamforming nodes;
   providing scheduling to a long link interface for delivering a stream of packets free of scheduling conflicts; and
   distributing a copy of the packets from an uplink of a long link interface based on the provided scheduling and using a second waveform, the first waveform being different from the second waveform, wherein distributing the copy of packets comprises:
   identifying nodes in a network and an arrangement of the nodes;
   computing a second-hop cover set for a first node in an arrangement of nodes in the network;
   computing a second-hop cover set for a second node in the arrangement of nodes in the network, wherein the second-hop cover set for the first node and the second second-hop cover set for the second node includes at least one relay node for forwarding packets to a second-hop nodes in the first and second second-hop cover set;
   determining a common node in the first and second second-hop cover sets;
   determining whether the first node or the second node has a higher priority; and
   selecting the common node as a forwarder for the first or second node determined to have the higher priority and removing the first or second node determined not to have the higher priority from the arrangement of nodes in the network.

2. The method of claim 1, wherein the identifying, computing a second-hop cover set for a first node, computing a second-hop cover set for a second node, determining a common node in the first and second second-hop cover sets, determining whether the first node or the second node has a higher priority and selecting the common node as a forwarder are repeated for each node iteratively to produce a resulting network arrangement.

3. The method of claim 1, wherein the resulting network arrangement becomes static in a static network and continuously adapts to dynamic networks.

4. The method of claim 1 further comprising initially arranging the nodes in the network as relays.

5. The method of claim 4 further comprising pruning the nodes in the network as being relays to reach a reduced set of forwarders to disseminate traffic to the nodes in the network.

6. A method for disseminating packets in a network performing distributed beamforming, comprising:
   distributing packets from nodes in a local area network using an interface and a first waveform to beamforming nodes;
   providing scheduling to a long link interface for delivering a stream of packets free of scheduling conflicts; and
   distributing a copy of the packets from a downlink of the long link interface based on the provided scheduling and using a second waveform, the first waveform being different from the second waveform, wherein the distributing the copy of the packets from the downlink of the long link interface comprises:
   identifying connected neighboring nodes for a node of interest;
   selecting connected neighboring node with a highest priority as a forwarder; and
   when node of interest has no connected neighboring nodes, selecting a neighboring node connected via multiple hops to a connected node as a forwarder.

7. The method of claim 6, wherein the identifying connected neighboring nodes, selecting connected neighboring node with a highest priority as a forwarder and selecting a neighboring node connected via multiple hops to a connected node as a forwarder are repeated for each node iteratively until the selecting connected neighboring node with a highest priority as a forwarder and selecting multi-hop disconnected neighboring node as a forwarder becomes static for each node in a static network and continuously adapts to dynamic networks.

8. The method of claim 7, further comprising pruning the nodes in the network as being relays to reach a reduced set of forwarders to disseminate traffic to the nodes in the network.

9. The method of claim 1, wherein the providing scheduling to the long link interface for delivering a stream of packets free of scheduling conflicts comprises:
   dividing the long link interface into epochs and slots
   allocating a number of slots proportional to a load of a disseminating node;
   allocating packet to a future epoch to allow time for dissemination;
   allocating packet to a slot in a distributed manner
   delivering a stream of ordered and time synchronized packets
   mapping a source node identifier and a packet identifier associated with an allocated packet to future epochs and slots; and
   providing a time reference across beamforming nodes.

10. The method of claim 9, wherein the mapping a source node identifier and a packet identifier associated with an allocated packet to future epochs and slots is performed according to:

$$ts_i = \left(\left[\frac{t_{now} + hD}{\Delta N}\right] + 1\right) \times \Delta N + n_i \Delta,$$

where $$\left(\left[\frac{t_{now} + hD}{\Delta N}\right] + 1\right) \times \Delta N$$

finds the epoch in the future, hD from now, where hD is a maximum dissemination delay, and $n_i\Delta$ is a slot time in that epoch with $\Delta$ being a slot duration and N is a maximum number of nodes, $ts_i$ is an $i^{th}$ time slot, and $t_{now}$ is an offset to a counter.

11. A network performing distributed beamforming, comprising:
a plurality of transmission nodes arranged in a network, the plurality of transmission nodes forming a local area network;
an intended node for receiving transmissions form the plurality of transmission nodes; and
a long link interface at the intended node for forming constructive interference from transmissions from the plurality of transmission node, the long link interface being provided scheduling for a delivery of a stream packets free of scheduling conflict;
wherein the plurality of transmission nodes in a local area network distributes packets using a first waveform to the intended node and distributing a copy of the packets via an uplink of the long link interface using a second waveform, the first waveform being different from the second waveform, wherein the plurality of transmission nodes distributes the copy of the packets by the uplink of the long link interface by:
identifying nodes in a network and an arrangement of the nodes;
computing a second-hop cover set for a first node in the arrangement of nodes in the network;
computing a second-hop cover set for a second node in the arrangement of nodes in the network, wherein the second-hop cover set for the first node and the second second-hop cover set for the second node includes at least one relay node for forwarding packets to a second-hop nodes in the first and second second-hop cover set;
determining a common node in the first and second second-hop cover sets;
determining whether the first node or the second node has a higher priority; and
selecting the common node as a forwarder for the first or second node determined to have the higher priority and removing the first or second node determined not to have the higher priority from the arrangement of nodes in the network.

12. The network of claim 11, wherein the plurality of transmission nodes repeat the identifying, computing a second-hop cover set for a first node, computing a second-hop cover set for a second node, determining a common node in the first and second second-hop cover sets, determining whether the first node or the second node has a higher priority and selecting the common node as a forwarder for each node iteratively until the selecting the common node as a forwarder becomes static in a static network and continuously adapts to dynamic networks.

13. A network performing distributed beamforming, comprising:
a plurality of transmission nodes arranged in a network, the plurality of transmission nodes forming a local area network;
an intended node for receiving transmissions form the plurality of transmission nodes; and
a long link interface at the intended node for forming constructive interference from transmissions from the plurality of transmission node, the long link interface being provided scheduling for a delivery of a stream packets free of scheduling conflict;
wherein the plurality of transmission nodes in a local area network distributes packets using a first waveform to the intended node and distributing a copy of the packets via a downlink of the long link interface using a second waveform, the first waveform being different from the second waveform, wherein the plurality of transmission nodes distributes the copy of the packets via the downlink of the long link interface by:
identifying connected neighboring nodes for a node of interest;
selecting connected neighboring node with a highest priority as a forwarder; and
when node of interest has no connected neighboring nodes, selecting a neighboring node connected via multiple hops to a connected node as a forwarder.

14. The network of claim 13, wherein the plurality of transmission nodes repeat the identifying connected neighboring nodes, selecting connected neighboring node with a highest priority as a forwarder and selecting one-hop disconnected neighboring node as a forwarder for each node iteratively until the selecting connected neighboring node with a highest priority as a forwarder and selecting one-hop disconnected neighboring node as a forwarder becomes static in a static network and continuously adapts to dynamic networks.

15. A network performing distributed beamforming, comprising:
a plurality of transmission nodes arranged in a network, the plurality of transmission nodes forming a local area network;
an intended node for receiving transmissions form the plurality of transmission nodes; and
a long link interface at the intended node for forming constructive interference from transmissions from the plurality of transmission node, the long link interface being provided scheduling for a delivery of a stream packets free of scheduling conflict;
wherein the plurality of transmission nodes in a local area network distributes packets using a first waveform to the intended node and distributing a copy of the packets via the long link interface using a second waveform, the first waveform being different from the second waveform;
wherein the long link interface scheduling for the delivery of the stream packets free of scheduling conflict is provided by:
dividing the long link interface into epochs and slots;
allocating a number of slots proportional to a load of a disseminating node;
allocating packet to a future epoch to allow time for dissemination;
allocating packet to a slot in a distributed manner;

delivering a stream of ordered and time synchronized packets;

mapping a source node identifier and a packet identifier associated with an allocated packet to future epochs and slots; and providing a time reference across beamforming nodes.

16. The wireless network of claim 15, wherein the source node identifier and the packet identifier associated with an allocated packet are mapped to future epochs and slots according to:

$$ts_i = \left(\left[\frac{t_{now} + hD}{\Delta N}\right] + 1\right) \times \Delta N + n_i \Delta,$$

where $$\left(\left[\frac{t_{now} + hD}{\Delta N}\right] + 1\right) \times \Delta N$$

finds the epoch in the future, hD from now, where hD is a maximum dissemination delay, and $n_i \Delta$ is a slot time in that epoch with $\Delta$ being a slot duration and N is a maximum number of nodes, $ts_i$ is an $i^{th}$ time slot, and $t_{now}$ is an offset to a counter.

* * * * *